(12) United States Patent
Bailey et al.

(10) Patent No.: US 9,430,573 B2
(45) Date of Patent: Aug. 30, 2016

(54) COHERENT QUESTION ANSWERING IN SEARCH RESULTS

(71) Applicant: MICROSOFT CORPORATION, Redmond, WA (US)

(72) Inventors: Peter Richard Bailey, O'Connor (AU); Michele Banko, Seattle, WA (US); Paul Baecke, Croydon (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 14/154,958

(22) Filed: Jan. 14, 2014

(65) Prior Publication Data

US 2015/0199436 A1    Jul. 16, 2015

(51) Int. Cl.
G06F 17/30    (2006.01)
G06F 7/36    (2006.01)

(52) U.S. Cl.
CPC .......... *G06F 17/30867* (2013.01); *G06F 7/36* (2013.01); *G06F 17/3064* (2013.01); *G06F 17/30876* (2013.01)

(58) Field of Classification Search
USPC ................... 707/722, 999.005, 708, E17.063
See application file for complete search history.

(56) References Cited

U.S. PATENT DOCUMENTS

| | | | |
|---|---|---|---|
| 7,805,430 B2 * | 9/2010 | Reeb | G06F 17/30634 707/708 |
| 7,873,624 B2 | 1/2011 | Agichtein et al. | |
| 7,991,609 B2 | 8/2011 | Brockett et al. | |
| 8,065,290 B2 | 11/2011 | Hogue | |
| 8,275,803 B2 | 9/2012 | Brown et al. | |
| 8,452,747 B2 * | 5/2013 | Narayanan | G06F 17/30693 707/706 |
| 8,819,006 B1 * | 8/2014 | Chechik | G06F 17/30864 707/728 |
| 8,990,201 B1 * | 3/2015 | Johnston | G06F 17/3064 707/722 |
| 2004/0249808 A1 * | 12/2004 | Azzam | G06F 17/30646 |
| 2006/0106769 A1 * | 5/2006 | Gibbs | G06F 17/276 |
| 2008/0109401 A1 | 5/2008 | Sareen et al. | |
| 2009/0112828 A1 | 4/2009 | Rozenblatt | |
| 2010/0010977 A1 * | 1/2010 | Choi | G06F 17/30864 707/E17.014 |
| 2010/0161618 A1 * | 6/2010 | Kim | G06F 17/30657 707/748 |

(Continued)

FOREIGN PATENT DOCUMENTS

WO    2013040607 A1    3/2013

OTHER PUBLICATIONS

"International Search Report & Written Opinion Issued in PCT Application No. PCT/US2015/010544", Mailed Date: Apr. 9, 2015, 10 Pages.

(Continued)

*Primary Examiner* — Debbie Le
(74) *Attorney, Agent, or Firm* — Dave Ream; Tom Wong; Micky Minhas

(57) ABSTRACT

Systems, methods, and computer-readable storage media for providing query-completion suggestions that include answers to the complete queries suggested while the user is formulating a search query. At least a portion of a search query is received by the search engine. As the portion of the search query is received, query-completion suggestions are identified and answers to the plausible search query completions are identified for inclusion in the search input area. Upon selection of a query-completion suggestion, the search engine results page is presented, wherein the search engine results page includes the answers in the snippets generated for the results that contain the answers to the completed queries suggested to the user.

20 Claims, 8 Drawing Sheets

(56) References Cited

U.S. PATENT DOCUMENTS

| | | | |
|---|---|---|---|
| 2012/0023120 A1* | 1/2012 | Kanefsky | G06F 17/3064 707/767 |
| 2013/0086509 A1* | 4/2013 | Satyanarayana | G06F 17/3064 715/781 |
| 2013/0246383 A1 | 9/2013 | White et al. | |
| 2013/0282749 A1 | 10/2013 | Batraski et al. | |
| 2013/0325438 A1* | 12/2013 | Griffin | G06F 17/273 704/9 |
| 2015/0006564 A1* | 1/2015 | Tomkins | G06F 17/3064 707/767 |

OTHER PUBLICATIONS

Mao, et al., "Research on Answer Extraction Method for Domain Question Answering System (QA)", In Proceeding of the International Conference on Computational Intelligence and Security, Dec. 11, 2009, 5 Pages.

"Highlighting Search Term History in Search Results", In the Journal of Technical Disclosure of IP.com, Sep. 1, 2009, 8 Pages.

Kwok, et al., "Scaling Question Answering to the Web", In Proceedings of ACM Transactions on Information Systems, vol. 19 Issue 3, May 1, 2001, 12 pages.

Komiya, et al., "Question answering system using Q & A site corpus Query expansion and answer candidate evaluation", In Journal of Springer Plus, Aug. 22, 2013, 11 pages.

Dumais, et al., "Web Question Answering: Is More Always Better?", In Proceedings of 25th Annual International ACM SIGIR Conference on Research and Development in Information Retrieval, Aug. 11, 2002, 9 pages.

Radev, et al., "Probabilistic Question Answering on the Web", In Journal of the American Society for Information Science and Technology, vol. 56, Issue 6, Apr. 2005, 13 pages.

Agichtein, et al., "Learning Search Engine Specific Query Transformations for Question Answering", In Proceedings of 10th International Conference on World Wide Web, May 1, 2001, 10 pages.

Pala, et al., "A Factoid Question Answering System Using Answer Pattern Matching", In International Joint Conference on Natural Language Processing, Oct. 14, 2013, 5 pages.

Figueroa, et al., "Searching for Definitional Answers on the Web Using Surface Patterns" In in IEEE of computer Society vol. 42, Issue 4, Apr. 2009, 9 pages.

"Second Written Opinion Issued in PCT Application No. PCT/US2015/010544", Mailed Date: Nov. 30, 2015, 6 Pages.

International Preliminary Report on Patentability Issued in PCT Patent Application No. PCT/US2015/010544, Mailed Date: Apr. 5, 2016, 7 Pages.

* cited by examiner

600

```
HIGHCLERE CASTLE, EARL AND COUNTESS OF CARNARVON, DOWNTON ABBEY
WWW.HIGHCLERECASTLE.CO.UK ▾

VISITING US - HISTORY OF HIGHCLERE CASTLE - THE STATE ROOMS - LADY ALMINA
HIGHCLERE CASTLE EXCLUSIVE CHRISTMAS SHOPPING EXPERIENCE HIGHCLERE CASTLE IS
DELIGHTED TO BE ABLE TO WELCOME A LIMITED NUMBER OF GUESTS ON THE EVENING OF THE 4TH...

HIGHCLERE CASTLE & GARDENS, CARNARVON FAMILY
WWW.HIGHCLERECASTLE.CO.UK/DOWN-ABBEY.HTML ▾          ~610
LONGSTANDING FRIENDS OF THE CARNARVON FAMILY, JULIAN FELLOWES HAD HIGHCLERE CASTLE IN
MIND AS HE WROTE DOWNTON ABBEY.
```

*FIG. 6*

HIGHCLERE CASTLE, EARL AND COUNTESS OF CARNARVON,
WWW.HIGHCLERECASTLE.CO.UK ▸
HIGHCLERE CASTLE EXCLUSIVE CHRISTMAS SHOPPING EXPERIENCE HIGHCLERE CASTLE IS
DELIGHTED TO BE ABLE TO WELCOME A LIMITED NUMBER OF GUESTS ON THE EVENING OF THE 4TH...

VISITING US                THE STATE ROOMS

HISTORY OF HIGHCLERE CASTLE    LADY ALMINA

OPENING TIMES              EGYPTIAN EXHIBITION  ~710

CONTACT US                 ABOUT US

HIGHCLERE CASTLE & GARDENS, CARNARVON FAMILY
WWW.HIGHCLERECASTLE.CO.UK/ABOUT-US.HTML ▸
HIGHCLERE CASTLE IS ON OF ENGLAND'S MOST BEAUTIFUL VICTORIAN CASTLES SET AMIDST 1,000
ACRES OF SPECTACULAR. PARKLAND

COHERENT QUESTION ANSWERING IN SEARCH RESULTS

BACKGROUND

The Internet, through its billions of Web pages, provides a vast and quickly growing library of information and resources. To find desired content, computer searchers often make use of search utilities. Exemplary Internet search engines are well known in the art, for instance, a commonly known commercial engine is the BING® search engine provided by Microsoft Corporation of Redmond, Wash.

To ensure users are providing a query that will prove most useful in retrieving the results they desire, many search utilities offer query-completion suggestions as the user inputs a partial search query (e.g. question). Upon selection of a particular query-completion suggestion, the selected query-completion suggestion is searched against the general web search domain and results are provided to the user in the form of a search engine results page presented in association with the general web search domain (e.g., www.bing.com).

One conventional search utility available to computer searchers is a question processing system. The conventional question processing system receives partial or complete questions from the searchers and returns a search results page having the questions and some answers to the received questions. In operation, conventional question processing systems rewrite the questions and search an index for documents having sentences that match the original questions and the rewritten questions. For instance, a searcher may issue "WHERE IS WALDO" to the questions processing system. This question may be rewritten as "WALDO IS IN" "WALDO IS AT," etc. The conventional question processing systems would then search for documents that contain the phrases "WHERE IS WALDO," "WALDO IS IN," or "WALDO IS AT."

Upon finishing the search in the index for documents, the documents with the phrases are selected by the conventional question processing systems. Then the terms included from the original query are highlighted by the conventional question processing systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention relate to systems, methods, and computer-readable storage media for, among other things, displaying query-completion suggestions including answers to questions that are related to a partial question entered in a search box. As a searcher is typing in the search box, the search engine may select several query completions. The query portion may be received, for instance, via a query-input region or search box presented in association with a general web search domain (e.g., www.bing.com, www.google.com, or the like). As the portion of the query is received, query-completion suggestions (that is, suggested complete queries determined based upon the query portion input) are identified. The query completion may include questions and answers to the questions. In turn, the search box is updated by the search engine to include the query completion suggestions.

The query-completion suggestions are provided in the search box such that selection thereof may cause searching of the query-completion suggestion. Thus, upon user selection of the particular query completion suggestion, the user may be navigated to a search engine results page having answers to the question or to a particular information domain linked to a selected query suggestion.

BRIEF DESCRIPTION OF THE DRAWINGS

Embodiments of the invention are illustrated by way of example and not limited in the accompanying figures in which like reference numerals indicate similar elements and in which:

FIG. 6 is a screen shot showing an exemplary search engine result page having answers to a question received in the search box in accordance with an embodiment of the invention;

FIG. 7 is a screen shot showing another exemplary search engine result page having answers to a question received in the search box in accordance with an embodiment of the invention.

DETAILED DESCRIPTION

Figure 1:
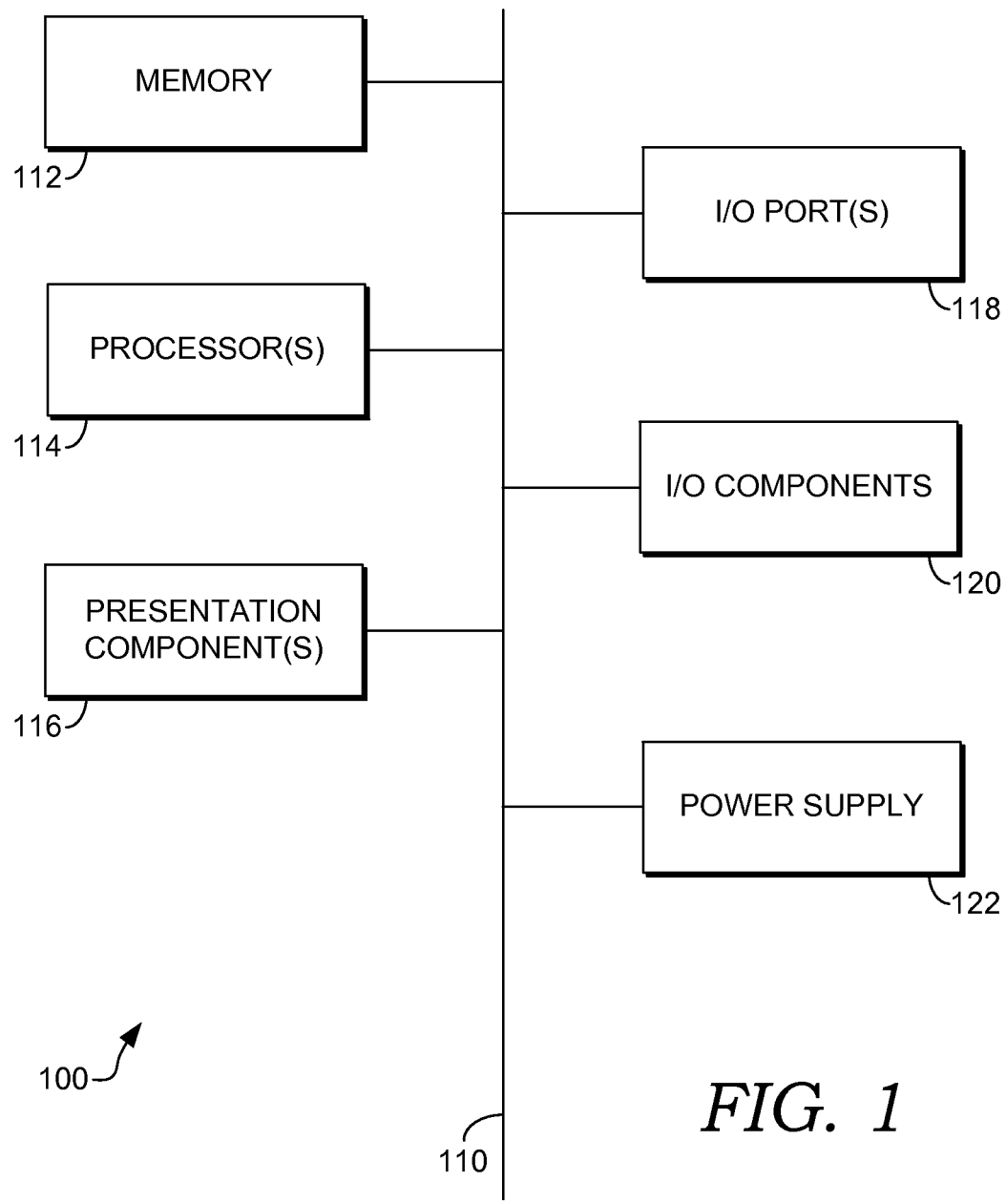
FIG. 1 is a block diagram of an exemplary computing environment suitable for use in implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

Embodiments of the invention are directed to providing answers to a partial query while the user is completing the partial query in a search box. The answers may be included in the query suggestions offered as potential completions to the partial query. In one embodiment, the answer to a question may not share many or even any of the terms of the question. For example, "WHERE IS DOWNTON ABBEY FILMED" has an answer of "HIGHCLERE CASTLE,"

which does not include any of the terms from the original question. The search engine may identify the probable answers to the potential completions fast enough to offer the probable answer(s) as query suggestion. Accordingly, the search box having a partial query "DOWNTON ABB" may be updated to include query completions like "WHERE IS DOWNTON ABBEY FILMED" and "HIGHCLERE CASTLE."

In turn, the search engine may generate a search engine results page. In this page, the search results may include uniform resource locators (URLs) and search results captions. The captions may emphasize the query terms from the original query and the terms from the answer for a selected query suggestion. The results are arranged such that popular documents for the query "HIGHCLERE CASTLE" that do not mention the aspects related to "DOWNTON ABBEY" which the searcher was interested in originally are ordered after documents that match both "HIGHCLERE CASTLE" and "DOWNTON ABBEY."

Accordingly, embodiments of the invention may be used both in displaying answer and context information within a query suggestion user experience or in a full set of search results user experience. The search engine may analyze the partial query to: identify likely completed queries and questions to be used in source identification; extract answers from these identified sources; rank the extracted answers that correspond to: the original partial query, the plausible query completions, the extracted answer, and the combination of key parts of both the original partial query and extracted answer.

Various aspects of the technology described herein are generally directed to systems, methods, and computer-readable storage media for, among other things, providing query-completion suggestions configured to be searched against information domains. The information domain is a content site generally provided in association with a search engine that provides content and organization specific to a particular topic. For instance, information domains may include, without limitation, shopping, videos, images, music, documents, and the like.

Accordingly, some embodiments of the invention are directed to one or more computer-readable storage media storing computer-useable instructions that, when used by one or more computing devices, cause the one or more computing devices to perform a method of searching the information domains for answers. The method includes receiving a portion of a search query, determining one or more query-completion suggestions for the received search query portion, identifying answers to one or more query-completions suggestions, and updating a search box to include the suggestions and answers as the searcher completes the partial query.

Another embodiment of the invention is directed to a system comprising a processor in communication with computer-readable storage media, an analysis component, an extraction component, a query-completion suggestion component, a snippet generation component, and a display component. The analysis component is configured to receive a portion of a search query, to classify the query, and to select potential completions for the query. The extraction component identifies answers to the search query. The query-completion suggestion component is configured to provide one or more query-completion suggestions for the received search query portion to the search box. The snippet generation component is configured to select a summary of the URL that contains answers to the query. The display component formats the snippets and query suggestions for presentation to the searcher.

In yet another embodiment, the one or more query-completion suggestions for the received query portion include answers to the suggestions. The answer may be associated with a particular information domain (e.g. video, image, shopping, etc.). Upon selection of the answer in the search box, the search engine may render the image, play the video, or initiate a purchase transaction. Accordingly, the user may bypass the search engine results page if the answer is available in the suggestions presented in the search box as the user completes the portions of the query.

Having briefly described an overview of embodiments of the invention, an exemplary operating environment in which embodiments of the invention may be implemented is described below to provide a general context for various aspects of these embodiments.

FIG. 1 is a block diagram of an exemplary computing environment suitable for use in implementing embodiments of the invention. Referring to the figures in general and initially to FIG. 1 in particular and computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a personal data assistant or other handheld device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, general-purpose computers, specialty computing devices, etc. Embodiments of the invention may also be practiced in distributed computing environments where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), system-on-a-chip (SOC), or complex programmable logic devices (CPLDs). The hardware logic allows a device to simplify queries provided by a user. The device is configured to generate statistical models based on search engine logs. The device may identify one or more terms of the query that should be dropped based on the statistical models. The device may, in an embodiment, drop one or more terms, receive results based on the simplified query having less than all the terms, and rank the results for display based on all the terms included in the query.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refers to "computer" or "computing device."

Computing device 100 typically includes a variety of computer-readable media. Computer-readable media can be any available media that is accessible by computing device 100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently. Computer storage does not include and excludes communication media.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller (such as a stylus, keyboard, and mouse) or a natural user interface (NUI), etc.

The NUI processes gestures (e.g., hand, face, body, etc.), voice, or other physiological inputs generated by a user. These inputs may be interpreted as queries, requests for selecting URIs, or requests for interacting with a URI included as a search result. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

As previously mentioned, embodiments of the invention are generally directed to systems, methods, and computer-readable storage media for, among other things, providing query-completion suggestions configured to be searched against information domains in response to receiving a partial query. At least a portion of a query is received by the computing device from the NUI. The query portion may be received, for instance, via a query-input region or search box. As the portion is received, query-completion suggestions are presented in the search box.

Various aspects of the technology described herein are generally employed in computer systems, computer-implemented methods, and computer-readable storage media for, among other things, selecting answers to partial queries. In one embodiment, a server executes query suggestion components that detect partial queries that are candidates for suggestion and that provide suggestions that include answers to the plausible completions included in the suggestions. The server may process the plausible complete queries generated by the system and the partial query received from the user to select search results. The search results include answers that may be highlighted based on satisfaction metrics (e.g., dwell time, click frequency, page visits, and conversion) in a log for the search engine.

In one embodiment, a computer system is configured to provide answers to a partial query. The computer system includes, among other components, an analysis component and a query-completion suggestion component. The analysis component receives the partial query, classifies the partial query, and identifies plausible completions. The query-completion suggestion component provides the plausible completions of the partial query to a user of the search engine. The query-completion suggestion component may include answers with the one or more of query-completion suggestions.

Figure 2:
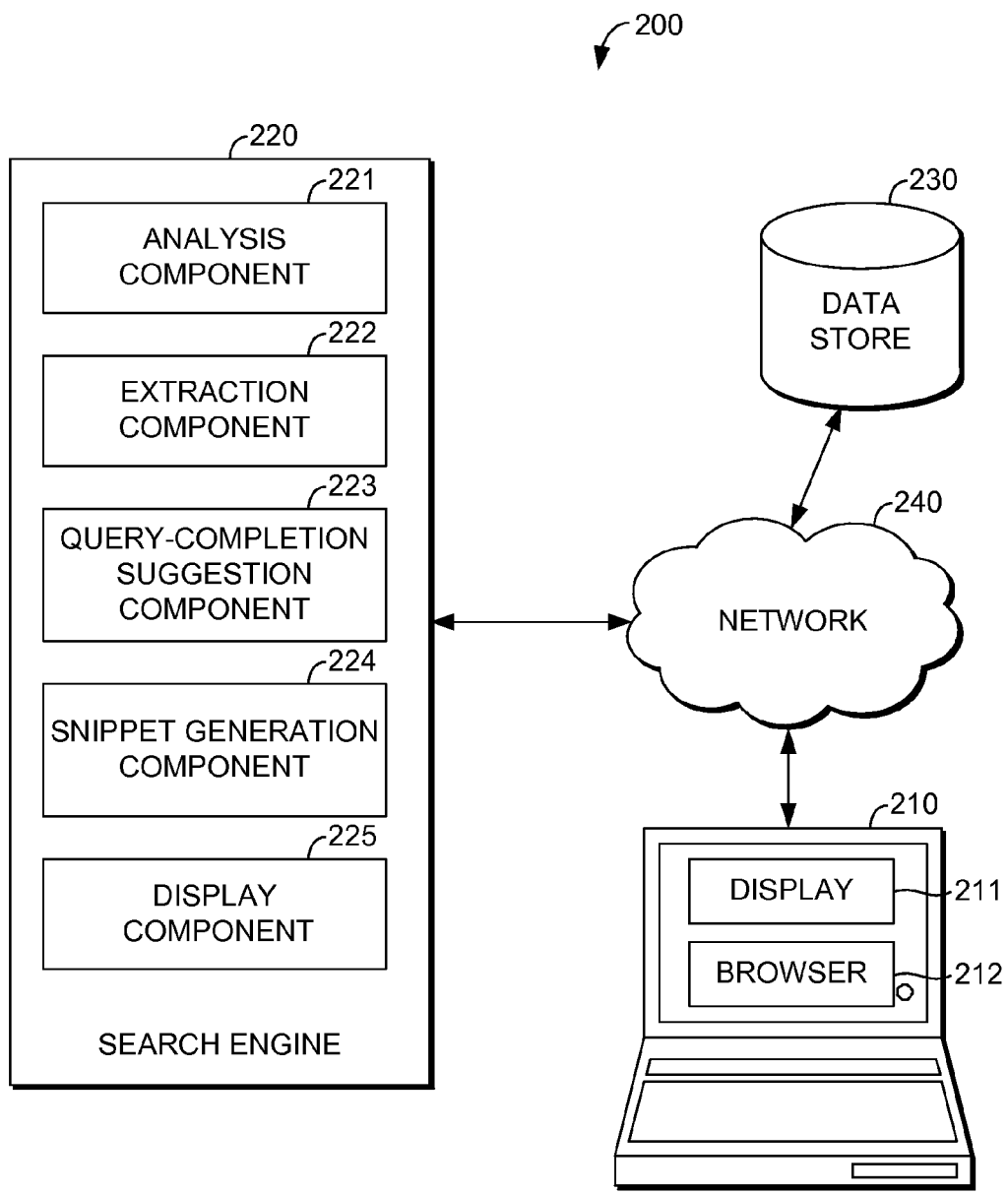
FIG. 2 is a block diagram of an exemplary computing system in which embodiments of the invention may be employed.

FIG. 2 is a block diagram of an exemplary computing system 200 in which embodiments of the invention may be employed. The computing system 200 may include client device 210, search engine 220, data store 230, and network 240. The network 240 may communicatively connect the client device 210, search engine 220, and data store 230. It should be understood that any number of client computing devices 210, search engines 220 and data stores 230 may be employed in the computing system 200 within the scope of embodiments of the invention. Each may comprise a single device/interface or multiple devices/interfaces cooperating in a distributed environment. For instance, the search engine 220 may comprise multiple devices and/or modules arranged in a distributed environment that collectively provide the functionality of the search engine 220 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

The client device 210 may be used to input one or more queries, including partial queries in a search box. The client device 210 may communicate the portions of the query received at the search box to the search engine 220. In an embodiment, the client device 210 may include any type of computing device, such as the computing device 100 described with reference to FIG. 1, for example.

Generally, the client device 210 includes a display 211 and a browser 212. The display 211 is configured to present various content including, without limitation, SERPs having results indexed within a particular vertical information domain rather than merely within the general web search domain as described herein. In embodiments, the display 220 is further configured to enable touch inputs from a user or provide a NUI.

The browser 212 is configured to render web pages, for instance, search engine results pages (SERPs), in association with the display 211 of the client computing device 210. The browser 212 is further configured to receive user input of requests for various web pages (including search engine home pages), receive user inputted partial queries (generally inputted via a graphical user interface or NUI) and to receive content for presentation on the display 211, for instance, from the search engine 220. The browser 212 may be any suitable type of web browser such as INTERNET EXPLORER®, FIREFOX®, CHROME®, SAFARI®, or other type of software configured to enable submission of search queries as described herein. It should be noted that the functionality described herein as being performed by the browser 212 may be performed by any other application capable of rendering web content. Any and all such variations, and any combination thereof, are contemplated to be within the scope of embodiments of the invention.

The search engine 220 is configured to receive partial queries from the client devices 210, provide query-completion suggestions, and return a search engine results page having answers to the suggestions received from the search engine 220. The search engine may implement any combination of the following components to process the partial queries: an analysis component 221, an extraction component 222, a query-completions suggestion component 223, a snippet generation component 224, and a display component 225. In one embodiment, before the user enters a query the answers and potential questions may be predetermined in the data store 230.

The analysis component 221, in one embodiment, receives a query and may identify plausible completions for the query. The analysis component 221 may detect that a partial query received by the search engine 220 is a question query. Question queries may be detected by parsing the query terms for "WHO, WHAT, WHY, WHERE, HOW," or other less common question formulations. The analysis component 221 detects the common words that start many questions. A classifier, in one embodiment, may be implemented by the analysis component 221 to determine whether a partial query is really a question query. The classifier may be created for several languages including English, and may use similar or different techniques in determining that the user has a question. Alternatives to the classifier include rule-based systems based on prefixes and clustering technologies. The cluster based technologies may generate a query-click graph from log data and randomly traverse the query-click graphs to identify or group question queries together.

For example, a popular current query is "WHAT DOES THE FOX SAY"; however, this is not a question query, but rather a query about a popular song/video by a Norwegian duo that has spawned many versions. On the other hand, another common query is "HOW MANY CALORIES ARE IN A BANANA." This is a question query. The analysis component 221 may assign a probability score to whether the received partial or suggested completion query is a question query based on log data stored in the data store 230 for the search engine 220. If the assigned scores are above a certain threshold, the analysis component 221 routes the query to a question answering segment of the search engine for additional processing. The question answering segment may parse the suggested question query and identify probable answers from the content in the data store 240.

Given a suggested question query, the analysis component 221 analyzes the question and identifies answer indicators. For example, the query "HOW MANY CALORIES ARE IN A BANANA" may be analyzed to identify the following: object, subject, and focus area. The analysis component 221 may identify the object of the question as "BANANA," the subject as "CALORIFIC CONTENT," and the focus of the question types starting with "HOW MANY" is typically seeking numeric quantity information. The analysis component 221 may retrieve a set of documents from the data store 230 based on the query.

Given a set of matching documents to the suggested query (or variants thereof, e.g. "HOW MANY CALORIES IN BANANA"), and corresponding extracted sources from the data store, the analysis component 221 identifies answers in the extracted sources. The extracted sources may be a subset of an entire document, a video clip, or an image. In one embodiment, the analysis component 221 may find matches to the suggest query completion in the sentences, sentence fragments, image data, video data, or other metadata (such as anchor text in HTML). Additional methods for matching can be implemented by the analysis component 221. The additional methods include term co-location or advanced natural language processing techniques like part-of-speech tagging and chunking, or combinations thereof. Similarly, custom dictionaries and term matching algorithms may be accessed by the analysis component 221 for concepts like units of measure (e.g., identifying numeric quantities for example) or alternative forms of the measures (e.g. kCal, joules).

In certain embodiments, the extraction component 222 receives the suggested query completions and potential answers from the analysis component 221. The potential answers, suggested query completions, and the partial query are combined and used to select matching documents from the data store 230. In some embodiments, the partial query, suggested completions, and plausible answer texts may be combined in various ways. Simple concatenation of the partial query, suggested completions, and plausible answer texts may be employed by the extraction component 222. However, better results are likely obtained from the search engine through alterations and augmentations of the partial query, suggested query, or answer. For instance, the alterations by the extraction component 222 may include dropping stop words (e.g., removing "IS"), preserving question words (e.g., keeping "WHERE"), and thereby may avoid common intent mismatches. Moreover, the extraction component 222 may weigh non-query terms (e.g. answer text) or inform the search engine 220 of query units that should be kept (e.g. keep together "DOWNTON ABBEY" or "HIGHCLERE CASTLE") but avoid (the combination of "DOWNTON CASTLE") may also yield better results for the query suggestions and the search engine results page.

In turn, the matching documents to the altered queries may be ranked by the extraction component 222. For instance, a rank may be assigned to each document based on metrics associated with the answers. The extraction component 222 may rank the documents based on frequency of answer text occurring, frequency of query text in the documents, co-occurrence of answer and query text, number of user clicks on document given query, or any other ranking features, or combination thereof.

Accordingly, the extraction component 222 issues multiple queries and combines/ranks results to create a ranked list of documents for inclusion in the search box or the search engine results page. Given the original partial query, suggested query completions, the extracted answer texts, and a combined partial query, suggested query, and answer text as a new query, the extraction component 222 may issue some or all of original partial query, suggested query completions, the extracted answer texts, and the new query to the search engine 220. The search engine 220 may receive results for each of the queries and combine the results. When some or all of the queries have produced lists of matching content, these results may be combined through standard federated ranking algorithms into a single results list. The search engine may traverse various knowledge repositories linked to the data store 230. These knowledge repositories include multimedia stores, news stores, application stores, and entity/entity-relation stores such as SATORI™ or OPENGRAPH from FACEBOOK™. The results from the knowledge repositories are combined for inclusion in the overall search results experience (e.g., search box or search engine results page).

The query-completion suggestion component 223 receives these results and the plausible query completions, and the potential answers from the extraction component 222. The query-completion suggestion component 223 provides the suggestions to the user as the user completes the partial query. The suggestions sent to the client device 210 may include the plausible completions, text fragments from matching documents, links to images or videos that contain the answer, or transaction initiation links. The suggestions may include answer indicators that are displayed in the search box on the search engine results page. For instance, the indicators may include symbols for an image, a video, or a transaction corresponding to the answer. The answers to "DOWNTON ABB" may include symbols for "HIGHCLERE CASTLE" or "ENGLAND." The symbols may include a coat of arms, a crown, or a castle. Each of the answers may be include in the search box or search engine results page such that the answer ("HIGHCLERE CASTLE" or "ENGLAND") that is most frequently clicked on based on the search logs is displayed first. Alternatively, the answer ("HIGHCLERE CASTLE" or "ENGLAND") that is most frequently clicked on may be displayed second.

Accordingly, the query-completion suggestion component 223 is configured to provide both the potential query completions and plausible answers to the client device. In some embodiments, the query-completion suggestion component 223 may display multiple candidate answers rather than a single most probable one. The query-completion suggestion component 226 is configured to identify one or more query-completion suggestions for the received search query or portion thereof and to identify an answer to the suggestions. Query-completion suggestions are suggested complete queries or answers that are selected based upon a range of evidence available to the search engine data store 230 (e.g., click logs, query frequencies, purchase transactions, hover etc.)

The snippet generation component 224 receives these results and the plausible query completions, and the potential answers from the extraction component 222. The snippet generation component 224 generates and summaries that are included in the search engine results page or the symbols that are selected for the answers in the search box. The snippet generation component 224 may identify terms from the results that are best able to summarize a document or the content available. The snippet generation component 224 may analyze the document structure, e.g., heading, titles, metadata, and file type to summarize the document having the answer. In some embodiments, that snippet generation component 224 may include the plausible answers and omit the partial query or the suggest query completion from the generated summaries. In one embodiment, as the user is typing the search queries, the search box is updated with symbols that summarize the plausible query completions or answers. Furthermore, a search engine results page may be transmitted to the client device, where the search engine results page may include the summaries provided by the snippet generation component 224.

In optional embodiments, the display component 225 is executed by the search engine 220 to render the user experiences for providing (i) entry of queries and (ii) viewing of answers and results. The display component 225 provides both query entry and search results viewing user experiences. The search result viewing experiences on the search engine results page include providing a single answer or an entire results list to the client device 210 for display. The display component 225 may be configured to provide extracted answer and some question and answer term-highlighted snippet context can be shown in a preliminary search engine results page while the client device 210 is receiving an affix of a question or query.

The display component 225 provides consistency in term highlighting as the client device transition from the search box updates and preliminary search engine results page to the complete SERP experience upon selection of a suggested query or completion of query by the user. For example, if the user asks the "WHERE IS DOWNTON ABBEY FILMED" question in the search box and sees "HIGHCLERE CASTLE" shown as the answer among the suggested queries in the search box, but later issues a query "DOWNTON ABBEY" or clicks through on "HIGHCLERE CASTLE" the display component 225 may include highlights the combined question ("DOWNTON ABBEY") plus answers ("HIGHCLERE CASTLE", "ENGLAND," OR "SCOTLAND").

The data store 230 is traversed by the search engine 220 to identify search results, identify potential suggestions, and answers as a partial query is received from a client device 210. The data store 230 may be a relational database that includes an index to content, including image, video, text, webpages, etc. The data store 230 may also include a search log that tracks statistics (e.g., dwell time, click rate, term frequency, search frequency) for each of the documents. These statistics are sent to the search engine for ranking of the search results, selection of answers, and snippet generation.

The network 240 communicatively connects the search engine 220 and client device 210. The network 240 may include, without limitation, one or more local area networks (LANs) and/or wide area networks (WANs). Such networking environments are commonplace in offices, enterprise-wide computer networks, intranets and the Internet. Accordingly, the network 240 is not further described herein.

The exemplary computing system 200 in which embodiments of the invention are employed is described above. Generally, the computing system 200 illustrates an environment in which query-completion suggestions having answers are identified during query entry. As will be described in further detail below, embodiments of the invention provide methods and graphical user interface elements for providing query-completion suggestions. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional components that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments of the invention are directed to computer-readable media storing computer-usable instruction for selecting answers. The method is executed by a search system to provide visually and topically coherent results when using question answering techniques in response to a query (e.g., question query). The partial query may be identified as a question query and results for plausible query completions are analyzed to extract corresponding answers. In one embodiment, the search system may issue multiple plausible query completions to a database. The plausible queries may include: the partial query, the plausible completions to the partial query, one or more extracted answers from results for the plausible completions, and any combination of any two of: the partial query, the plausible completions, and the extracted answers. The results from the multiple queries are combined and ranked. The results include documents that may be shown as part of the user experience (e.g., a search engine results page) or answers extracted from the documents, where the extracted answers are displayed in a derived experience (e.g., a query suggestions interface).

Figure 3:
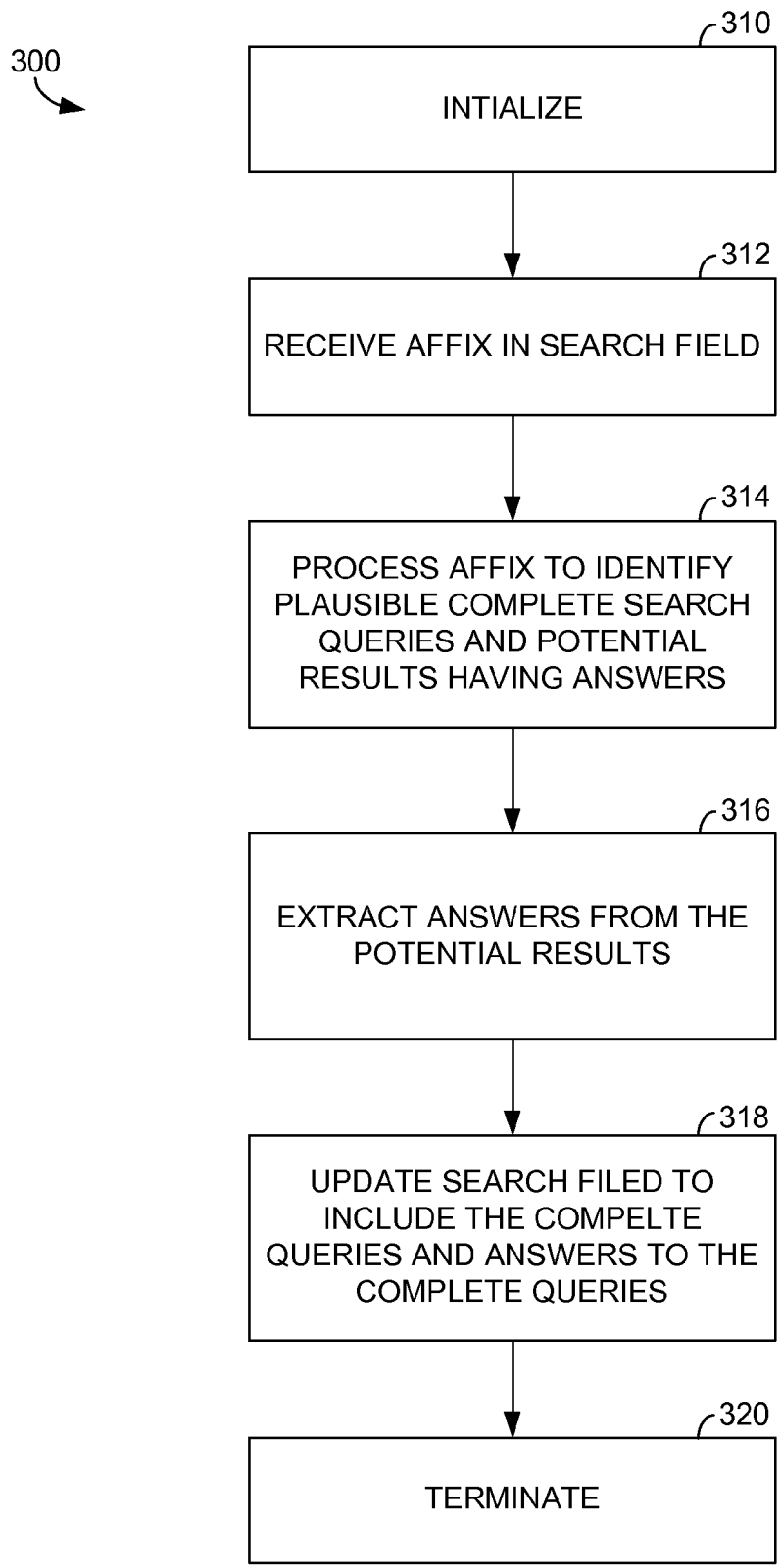
FIG. 3 is a logic diagram showing an exemplary method for selecting answers in accordance with embodiments of the invention.

FIG. 3 is a logic diagram showing an exemplary method for selecting answers in accordance with embodiments of the invention. The method is initialized in step 310 when the search engine is connected to any network (e.g. the Internet). In step 312, the search engine receives an affix to a search query in a search field. In step 314, the search engine processes the affix to identify plausible complete search queries for the affix. In some embodiments, the complete query is a natural language query. In other embodiments, the complete query is a question query. The plausible complete queries that are selected by the search engine include queries that complete the received affix.

Additionally, the search engine is configured to select potential results that match the complete search queries and to select results that provide answers to the complete search queries. In turn, the answers are extracted from the potential results, in step 316. The search field, in step 318 is updated to include the complete queries and answers to the complete queries as suggestions. In one embodiment, the search engine highlights the answers in the search field. The answers may be contained in a multimedia file (e.g. video file, audio file, or image file) stored by a database traversed by the search engine. Graphical images or multimedia content that contain the answers to the complete search queries may be selected and extracted by the search engine. When providing the search engine results page to the client device, the search engine may include snippets from the results or multimedia files that include answers to the complete search query. In certain embodiments, the answers do not include terms from the affix or the complete search query. The method terminates in step 320.

Accordingly, embodiments of the invention extract one or more answers from documents that are identified for a query suggestion associated with a partial query that is currently being entered at a client device. The answers may be displayed in a preliminary search engine results page and a search box as the user continues to enter the search query. The answers are combined for display at the client device based on statistics associated with the suggested complete query or the extracted answers.

In some embodiments, the query suggestion interface is updated by the search engine as the user enters a partial query. The updates to the query suggestions interface include plausible completions, answers, and symbols that summarize the answers. In some embodiments, the query completions suggestions and answers to the query completion suggestions are ordered based on usage or engagement statistics associated with the query completions suggestions and answers.

Figure 4:
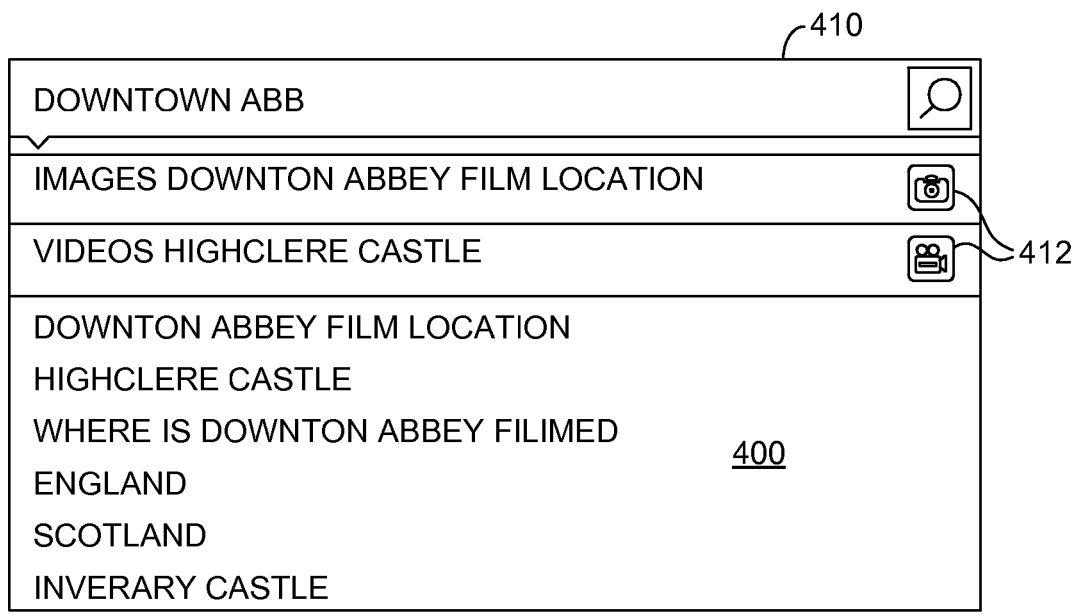
FIG. 4 is a screen shot showing an exemplary screen display of query-completion suggestions being presented in association with a query-input region or search box in accordance with an embodiment of the invention.

FIG. 4 is a screen shot showing an exemplary screen display 400 of query-completion suggestions being presented in association with a query-input region or search box 410 in accordance with an embodiment of the invention.

As illustrated, a user has input the query portion "DOWNTON ABB" into the query-input region or search box 410 provided by the search engine. A plurality of query-completion suggestions or answers is shown in association with the query-input region including "IMAGES DOWNTON ABBEY FILM LOCATION," "VIDEOS HIGH CLERE CASTLE," "ENGLAND" "SCOTLAND," etc. The query-completion suggestions having the terms "IMAGES" and "VIDEOS" preceding the terms query completion suggestion or answers are summaries included by the search engine. The graphical summaries 412 of an image or video icon related to the query completion suggestion or answers may also be presented in the search box. In one embodiment, the summary terms "IMAGES" and "VIDEOS" may be presented in a different font, in a different color, underlined, italicized, or in any other way presented such that they stand out relative to the other terms presented in the query-completion suggestion as an indication to the user that something different is going to happen (e.g., that they are going to be navigated to a particular information domain corresponding to the query completion suggestion or answer) upon selection of the particular query-completion suggestion or answer. In the illustrated embodiment, a graphical indicator 412 is also presented as an indication that the presented query-completion suggestion will be searched against information indexed in association with a particular information domain. Any and all such variations, and any combination thereof, are contemplated to be within the scope of embodiments of the invention.

Figure 5:
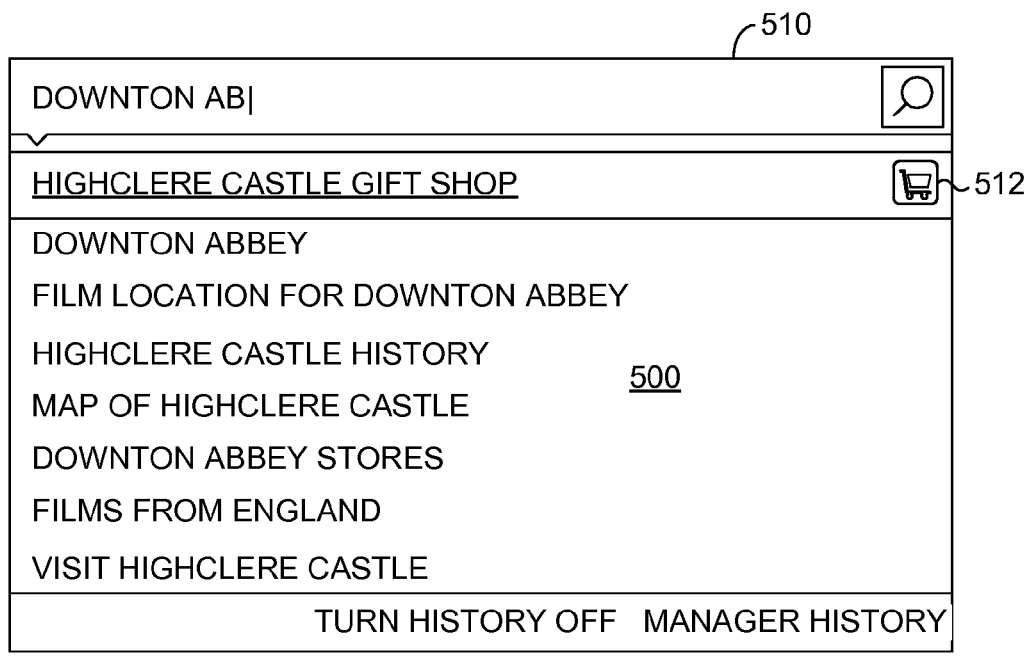
FIG. 5 is a screen shot showing another exemplary screen display of query-completion suggestions in a query-input region or search box in accordance with an embodiment of the invention.

FIG. 5 is a screen shot showing another exemplary screen display 500 of query-completion suggestions in a query-input region or search box in accordance with an embodiment of the invention.

With reference to FIG. 5, a schematic diagram is illustrated showing another exemplary screen display 500 of query-completion suggestions presented in association with a query-input region or search box 510, in accordance with an embodiment of the invention.

As illustrated, a user has input the query portion "DOWNTON AB" into the query-input region or search box 510. A plurality of query-completion suggestions or answers is shown in association with the query-input region including "HIGHCLERE CASTLE GIFT SHOP," "DOWNTON ABBEY," "FILM LOCATION FOR DOWNTOW ABBEY," etc. The top-listed suggestion is an answer corresponding to a "SHOPPING" domain for "HIGHCLERE CASTLE". In embodiments, the summary term "SHOPPING" may be presented in a different font, in a different color, underlined, italicized, or in any other way presented such that they stand out relative to the other terms presented in the query-completion suggestion as an indication to the user that something different is going to happen (e.g., that they are going to be navigated to a transaction information domain) upon selection of the particular answer. In the illustrated embodiment, a graphical indicator 512 is also presented as an indication that the presented suggestion may initiate a shopping transaction with the client device. Any and all such variations, and any combination thereof, are contemplated to be within the scope of embodiments of the invention.

In one embodiment, the search engine may provide preliminary search engine result pages that are updated upon receiving the complete search query from the user of the client device. Both the preliminary search engine results page and the updated search engine results pages include results and summaries for the results. The results may include the terms of the original partial query or the suggested query completion.

FIG. 6 is a screen shot showing an exemplary search engine result page 600 having answers to a question received in the search box in accordance with an embodiment of the invention. The search engine results page 600 include results (e.g. URLs) and captions 610 that summarize the results. The captions 610 selected by the search engine may include the terms of the partial query or the query completion suggestions. For instance, the results returned in response to query portion "DOWNTON AB" include WWW.HIGHCLERECASTLE.CO.UK/DOWN-AB-BEY.HTML and WWW.HIGHCLERECASTLE.CO.UK. These results are displayed by the search engine with summaries comprising a title or caption having the terms of partial query and the plausible query completion suggestions ("DOWNTON ABBEY").

In other embodiments, the search engine may provide preliminary search engine result pages that are updated upon receiving the complete search query from the user of the client device. Both the preliminary search engine results page and the updated search engine results pages include results and summaries for the results. The results may omit the terms of the original partial query or the suggested query completion.

FIG. 7 is a screen shot showing another exemplary search engine result page 700 having answers to a question received in the search box in accordance with an embodiment of the invention. The search engine results page 700 include results (e.g. URLs) and captions 610 that summarize the results. The captions 710 selected by the search engine may include the terms of the answer but omit the terms for partial query or the query-completion suggestions. For instance, the results returned in response to query portion "DOWNTON AB" include WWW.HIGHCLERECA-STLE.CO.UK/ and WWW.HIGHCLERECASTLE.CO.UK/ABOUT US. These results are displayed by the search engine with summaries comprising a title or caption omitting the terms of partial query and the plausible query completion suggestions ("DOWNTON ABBEY"). Instead the results and summarizes focus on the answer to a plausible answer to the plausible query completion for "WHERE IS DOWNTON ABBEY FILMED").

Figure 8:
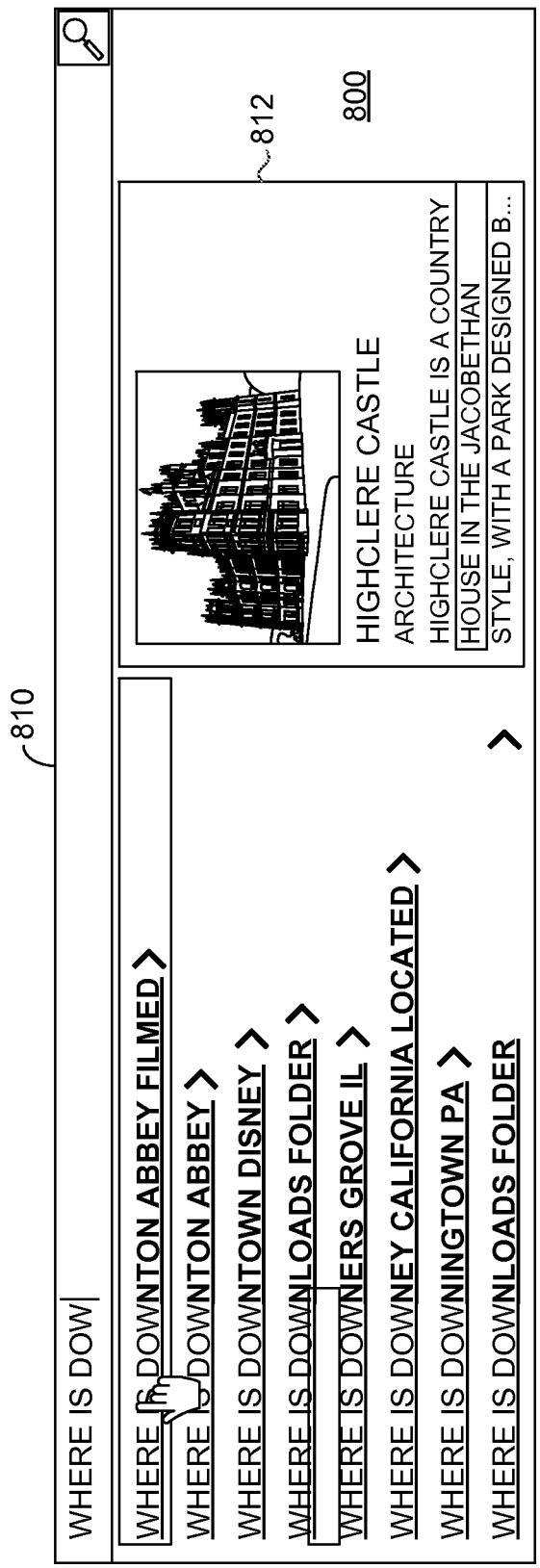
FIG. 8 is a screen shot showing another exemplary screen display of query-completion suggestions in a query-input region or search box in accordance with an embodiment of the invention.

FIG. 8 is a screen shot showing another exemplary screen display 800 of query-completion suggestions in a query-input region or search box in accordance with an embodiment of the invention. With reference to FIG. 8, a schematic diagram is illustrated showing another exemplary screen display 800 of query-completion suggestions presented in association with a query-input region or search box 810, in accordance with an embodiment of the invention.

As illustrated, a user has input the query portion "WHERE IS DOW" into the query-input region or search box 810. A plurality of query-completion suggestions or answers is shown in association with the query-input region including "WHERE IS DOWNTON ABBEY FILMED," "WHERE IS DOWNTON ABBEY," "WHERE IS DOWNTOWN DISNEY," etc. The top-listed suggestion may be an answer corresponding to a frequent search "WHERE IS DOWNTON ABBEY FILMED." Upon a user hovering over the "WHERE IS DOWNTON ABBEY FILMED" suggestion, the search box 810 may be updated with a graphic representation 812 of the answer "HIGHCLERE CASTLE" that is configured to link the domain corresponding to "HIGHCLERE CASTLE." In embodiments, the graphic representation 812 may be presented in a different font, in a different color, underlined, italicized, or in any other way presented such that they stand out relative to the other terms presented in the query-completion suggestion as an indication to the user that something different is going to happen (e.g., that they are going to be navigated to a transaction information domain or bypassing the search engine results page) upon selection of the particular answer. Any and all such variations, and any combination thereof, are contemplated to be within the scope of embodiments of the invention.

In summary, a search engine is configured to receive search queries in a search box. The search queries include partial queries that are analyzed to identify answers and complete queries for the partial queries. These complete queries are identified by the search engine such that the answers and complete queries are displayed in the search box while the user is completing the partial query. The search engine is connected to one or more databases that are configured to store content that is accessible by the search engine to provide responses to the partial or complete search query entered in the search box and transmitted by the search engine to the one or more databases. The answers to the partial or complete queries may be located in the content stored by the one or more databases. In certain embodiments, the complete search queries identified by the search engine may include the answers. In turn, the search engine generates preliminary and updated search engine results pages that include URLs and snippets. The snippets may include the answers to the partial or complete search queries. Accordingly, complete search queries having answers are formulated by the search engine, are displayed in the search box as a suggestion, and are issued to the database connected to the search engine. The search engine results pages generated in accordance with the above embodiments of the invention may include better search results and improved summaries over the conventional search systems.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the Figures and described above are not meant to limit the scope of the embodiments of the invention in any way and, in fact, the steps may occur in a variety of different sequences within embodiments hereof. Any and all such variations, and any combination thereof, are contemplated to be within the scope of embodiments of the invention.

What is claimed is:

1. A computer-implemented method for selecting answers to a query, the method comprising:
   receiving an affix to a search query in a search field;
   determining that the affix is a question query comprising a question;
   determining plausible complete question queries for the affix;
   selecting potential results that match the complete question queries;
   from the potential results, selecting results that provide answers to the complete question queries;
   extracting the answers from the selected results; and
   updating the search field to include the complete question queries and the answers to the complete question queries.

2. The computer-implemented method of claim 1, wherein the answers displayed in the search field display a graphical representation of one or more of the answers.

3. The computer-implemented method of claim 1, wherein the answers displayed in the search field include a link for an audible recording for at least one of the answers.

4. The computer-implemented method of claim 1, further comprising: highlighting the answers in the search field.

5. The computer-implemented method of claim 1, wherein an answer is in a multimedia file.

6. The computer-implemented method of claim 1, further comprising: selecting the plausible complete question queries that complete the received affix of the search query.

7. The computer-implemented method of claim 1, further comprising: composing snippets from the results that include answers to the complete question queries.

8. The computer-implemented method of claim 7, wherein the answers do not include terms from the affix or a complete question query.

9. The computer-implemented method of claim 1, further comprising: selecting graphical images or multimedia content that contain the answers to the complete question queries.

10. A computer system for selecting answers to a query, the system comprising:
    a search engine to
       receive search queries in a search box, wherein the search queries include partial queries, wherein a partial query is determined to be a question query and is analyzed to determine complete queries for the partial query;
       retrieve search results for the complete queries;
       extract answers that correspond to the question query from the search results; and
       display the answers and complete queries in the search box while the user is completing the partial query; and
    one or more databases configured to store content that is accessible by the search engine to provide responses to the partial query or a complete search query entered in the search box and transmitted by the search engine to the one or more databases.

11. The computer system of claim 10, wherein the answers are located in the content stored by the one or more databases.

12. The computer system of claim 11, wherein the one or more databases include multimedia databases.

13. The computer system of claim 11, wherein the answers displayed in the search field display a graphical representation of one or more of the answers.

14. The computer system of claim 11, wherein the answers displayed in the search field include a link for an audible recording for at least one of the answers.

15. The computer system of claim 11, wherein the complete search queries formulated by the search engine include the answers in complete search queries that are submitted to the database or displayed in the search box.

16. The computer system of claim 11, wherein the search engine generates a search engine results page that includes URLs and snippets.

17. The computer system of claim 11, wherein the snippets include the answers to the partial or complete search queries.

18. One or more computer-storage media having computer-executable instruction for performing a computer-implemented method for selecting answers to a query, the method comprising:
    receiving a partial question in a search field from a searcher;
    determining plausible complete questions that complete the partial question;
    selecting potential results that match the complete questions;
    selecting results from the potential results that provide answers to the complete questions;
    extracting the answers from the selected results; and while the partial question is being modified by the searcher, updating the search field to include the complete questions and answers to the complete questions.

19. The media of claim 18, further comprising: composing snippets from the results that include answers to the complete questions.

20. The computer-implemented method of claim 1, wherein the answers are presented as query suggestions.

* * * * *